United States Patent [19]
Miki et al.

[11] Patent Number: 5,544,043
[45] Date of Patent: Aug. 6, 1996

[54] CHECK PROCESSING EQUIPMENT

[75] Inventors: Shoji Miki; Hiroki Tsubota; Masanori Yokota; Kenta Hori, all of, Himeji, Japan

[73] Assignee: Glory Kogyo Kabushiki Kaisha, Hyogo, Japan

[21] Appl. No.: 399,877

[22] Filed: Mar. 7, 1995

[30] Foreign Application Priority Data

Mar. 7, 1994 [JP] Japan .................................. 6-062053

[51] Int. Cl.⁶ .................................................. G06F 15/00
[52] U.S. Cl. ....................... 364/406; 364/478.13; 235/379
[58] Field of Search ..................................... 364/406, 478; 235/379

[56] References Cited

U.S. PATENT DOCUMENTS

| | | | |
|---|---|---|---|
| 4,733,359 | 3/1988 | Luperti et al. | 364/406 |
| 5,204,811 | 4/1993 | Bednar et al. | 364/406 |
| 5,237,158 | 8/1993 | Kern et al. | 235/379 |

FOREIGN PATENT DOCUMENTS 62-284468 12/1987 Japan.

*Primary Examiner*—Harold Pitts
*Attorney, Agent, or Firm*—Jeffrey L. Thompson

[57] ABSTRACT

A check processing equipment having an optical amount character recognizing function for a proof machine used at a bank. A received amount can be corrected on an image screen, and it enables the efficient processing for certifying operation. A document capturing unit converts the data on the document into an image data and transfers the image data to a frame memory of recognizing unit. A recognizing unit compresses the image data through a recognizing/determining section and also carries out CAR with the attribute on an E13B code line data. A work station stores the compressed image data, the code line data, and the CAR result in a hard disk and it also displays an extended image and implements the proof of a whole batch through key-in operation for handling unrecognizable data and exceptional error data. An encoder unit performs encode printing and endorse printing on proved documents while verifying the code lines thereof.

8 Claims, 9 Drawing Sheets

CHECK PROCESSING EQUIPMENT

BACKGROUND OF THE INVENTION

1. Field of the Invention

The present invention relates to a check processing equipment to which a courtesy amount recognition (CAR) art is applied for a document processing at a bank and, more particularly, for certifying work in a check processing.

2. Description of the Related Art

In general, financial institutions are mechanizing clerical processing such as totalizing by printing routing number, an account number, etc. with a special ink, which contains iron oxide, in magnetic ink characters, which are readable both to human and machine, in an area called a clear band at the bottom of a document such as a deposit ticket and check form issued to a business acquaintance having a current account. The printed magnetic ink characters are read by a sorter computer so as to mechanize the sorting and totalizing work for incoming, outgoing in check processing. Further, if an account number, amount and other necessary information printed in magnetic ink characters, then on-us check can be processed through the sorter computer system of the bank for withdrawal from a current account.

The column of amount is usually filled by a customer by using a printer or by handwriting when the customer issues the check. A proof operator used to print the amount with magnetic ink, referring to the amount entered in the column of amount of a document. Further, the front and back (endorsement) of the document are photographed by a camera or the like and saved in the form of a microfilm (refer, for example, to Japanese Patent Laid-Open No. 62-284468) as an evidence for a follow-up survey if an accident such as the loss, damage, and misdelivery of the document form which has been brought out should occur.

For accomplishing higher efficiency of the processing stated above, a system, which utilizes the character recognizing art for recognizing an amount by using a proof machine, has been proposed. The system, however, has a shortcoming in that a document must be fed out from a hopper, carried, recognized, and subjected to a series of proving steps for each minimum proof unit (transaction); and until this series of processing is defined, the recognition processing for the next transaction cannot be initiated (refer, for example, to U.S. Pat. No. 5,204,811).

There has also been proposed a document processing system based on image processing. The system includes a high-speed image capturer, large-capacity disk, high-speed network, power encoder, etc. In such a system, key entry work including the correction of amounts and balancing is performed by distributed work stations (WS), each of which is assigned a different task (refer, for example, to U.S. Pat. No. 5,237,158).

The document processing system described above is designed to match data to a corresponding actual document by E13B code, check number, etc. which are a kind of the magnetic ink characters. If, however, a trouble such as documents being switched in the course of processing happens, then it is difficult to find the documents and corresponding data thereof, making recovery from the trouble difficult. The document processing system is also disadvantageous in that the throughput of the whole system is affected by the different levels of skill of the operators who are engaged in the correction work carried out through the work stations.

SUMMARY OF THE INVENTION

The present invention has been made with a view toward solving the above problems, and it is an object of the present invention to provide a check processing equipment which enables a document to be read, corrected, and subjected to magnetic printing (encoder) and endorsement printing (endorser) concurrently, thereby achieving higher processing efficiency.

To this end, according to the present invention, there is provided a check processing equipment which is equipped with: a document capturing unit which is constituted by a hopper to be loaded with documents such as checks consisting of a plurality of transaction units, a feeder which feeds one document at a time, a transferring unit which transfers the fed document to a stacker, a magnetic ink character reading means for reading magnetic ink characters printed on a document, and an image capturing means which is provided on the transferring unit and which captures and digitizes the image of the document; a recognizing unit which is constituted by an amount character recognizing means for recognizing amount characters from an image, a first storage means for storing an amount which has been recognized by the recognizing means, a second storage means for storing an image which has been captured through the image capturing means, and a recognizing/determining means for determining the type of the document from the attribute of the magnetic ink characters captured through the magnetic ink character capturing means and for identifying the captured image position of the image data stored in the second storage means, a display means for displaying document image data which stored in said second storage means, in the form of an image; and an input means for allowing a numeral change to be made to correct an amount indicated on a document; and for entering the type of processing, whereby a document is fed out by said feeder, a magnetic ink character is read by said magnetic ink character reading means, and the image of the document is captured by said image capturing means concurrently as said recognizing/determining means displays an amount indicating section of a particular document on said displaying means, enabling an operator to correct an amount through said input means.

Further, according to the present invention, there is provided a check processing equipment which is equipped, in addition to the aforesaid document capturing unit and the recognizing unit, with an encoder unit which has a hopper to be loaded with a plurality of documents in each batch, the balancing of which has been completed, a feeder for feeding a document at a time, a transferring unit for transferring a fed document to a stacker, a magnetic ink character reading means for capturing the attribute data from the document, an encoding printer for printing magnetic ink characters, an endorsing printer for printing characters on the back face of the document, and a controller for printing by using the encoding printer the amount data stored in the second storage means in accordance with the attribute data of the document which has been read through the magnetic ink character reading means, for printing characters, which indicate the completion of processing, on the back face by using the encoding printer, and for capturing and recognizing the documents on a batch basis concurrently.

BRIEF DESCRIPTION OF THE DRAWINGS

In the accompanying drawings:

FIGS. 2A to 2G are explanatory illustrations showing the details of document in a transaction unit regarding documents, respectively;

DESCRIPTION OF THE PREFERRED EMBODIMENTS

An embodiment of the check processing equipment according to the present invention will be described with reference to the accompanying drawings.

Figure 1:
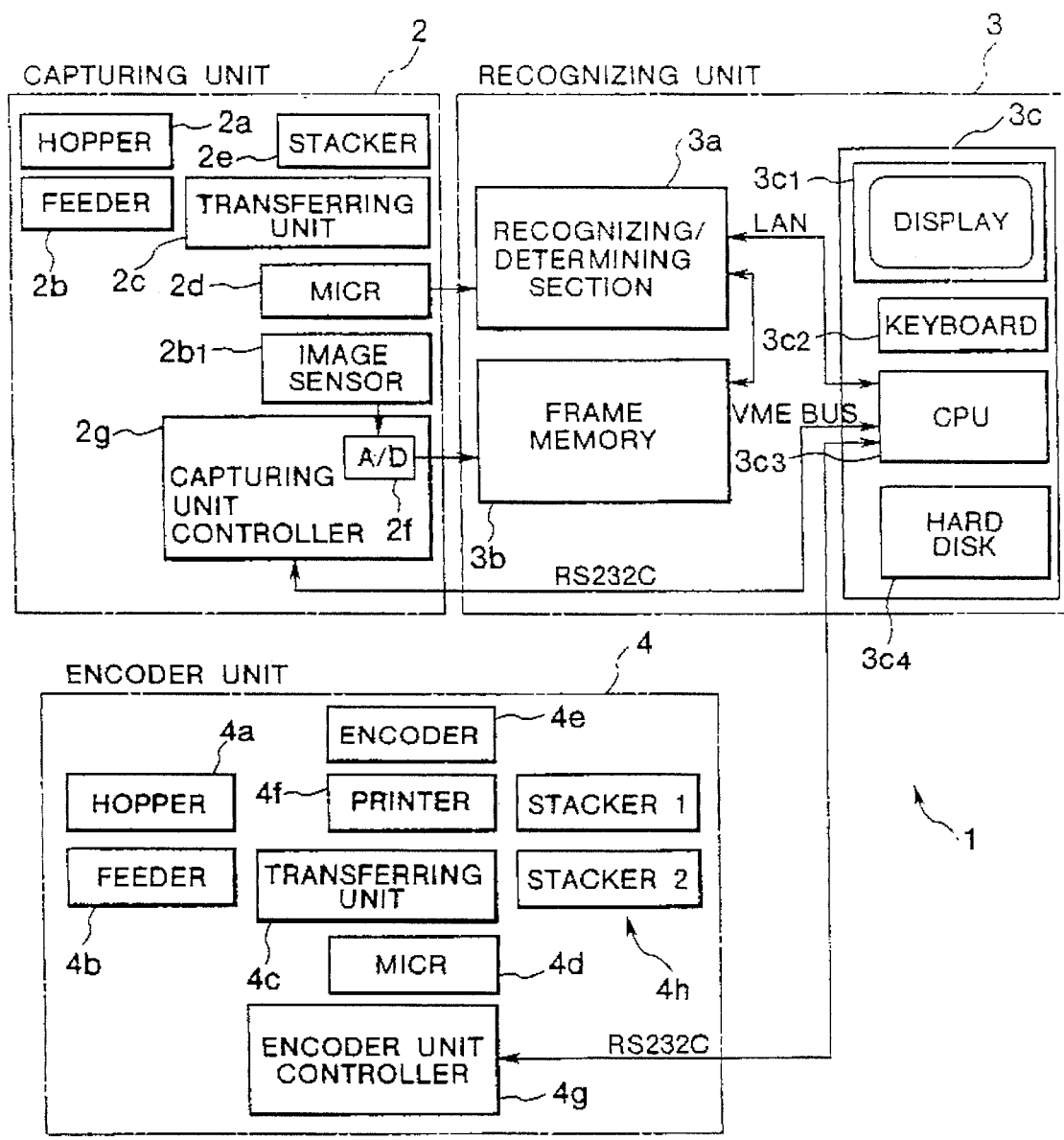
FIG. 1 is a block diagram showing a construction of an embodiment of a check processing equipment in accordance with the present invention.
Figures 2A, 2B, 2C, 2D, 2E, 2F, 2G:
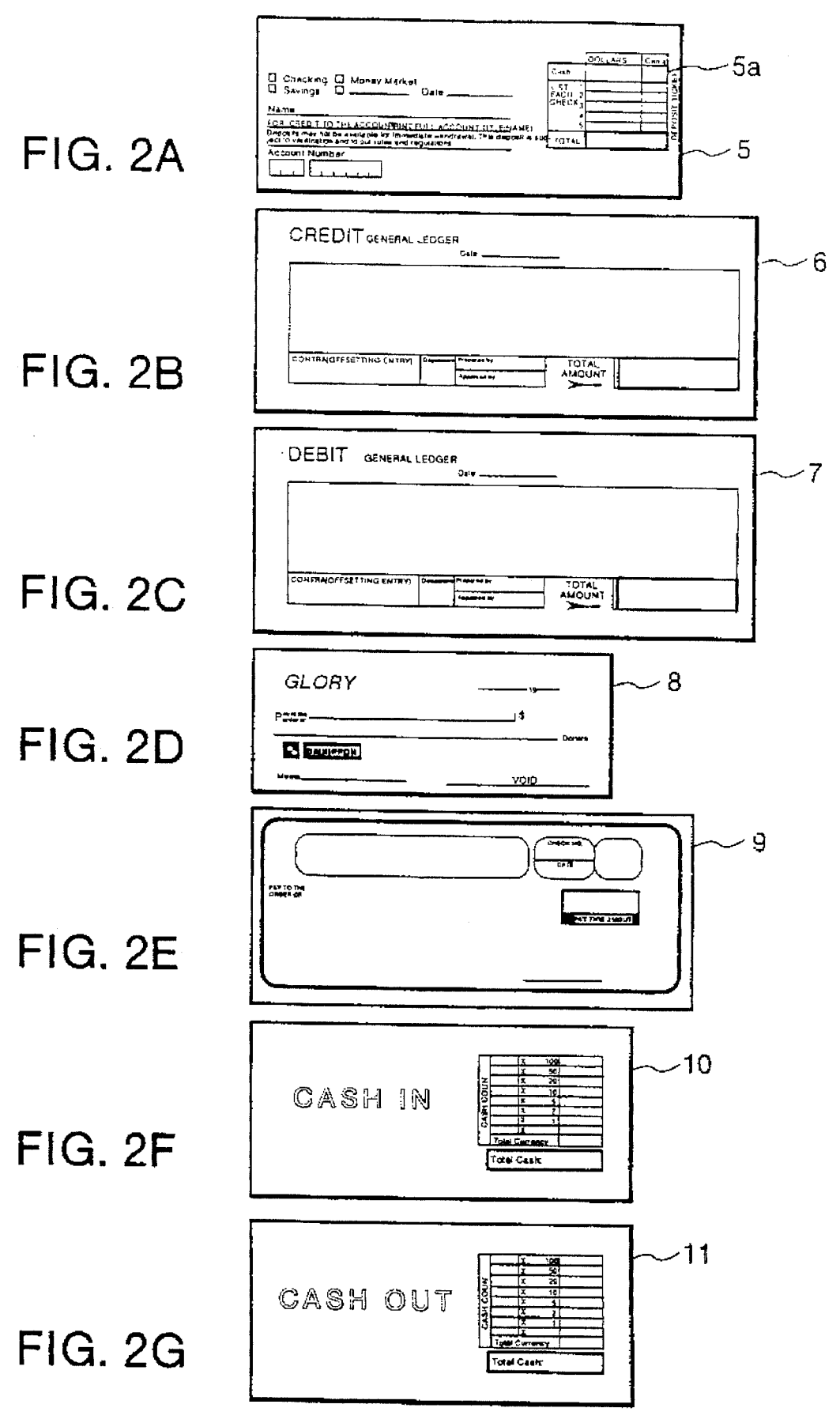

FIG. 1 is the block diagram showing a construction of a processing equipment for documents such as checks used mainly at banks in the United States. A check processing equipment 1 is constituted by a capturing unit 2, a recognizing unit 3, and an encoder unit 4. The capturing unit 2 has a hopper 2a, a feeder 2b, a transferring unit 2c, a magnetic ink character reader (MICR) 2d, an optical image sensor 2d1 for optically capturing images of the document, an A/D (analog-to-digital) converter 2f, a capturing unit controller 2g, and a stacker 2e. The hopper 2a can be loaded with up to 300 documents of a plurality of transaction units (a plurality of transaction units are referred to as "1 batch"). As shown in FIGS. 2A to 2G, the unit of transaction usually consists of a deposit ticket 5 (FIG. 2A) and any or all of a plurality of documents of bank slips 6, 7 (FIGS. 2B and 2C), a personal check 8 (FIG. 2D), a business check 9 (FIG. 2E), a cash in ticket 10 (FIG. 2F), and a cash out ticket 11 (FIG. 2G).

The feeder 2b automatically-feeds the documents loaded on the hopper 2a to the transferring unit 2c at a rate of one piece per second. The transferring unit 2c transfers the fed documents at a rate of 720 mm/sec. The magnetic ink character reader (MICR) 2d is provided with a magnetic head for a magnetic ink character reader to magnetically read magnetic ink characters (bank number, branch number, account number, attribute characters for processing at bank, etc.) which are printed in a clear band located at the bottom of the document. Provided on the downstream side of the magnetic head is the image sensor 2d1 (e.g. CCD (Charge Coupled Device) of 300 dots per inch (DPI)) for capturing images of the document, which is a line sensor and is installed orthogonally with the document transferring direction. The documents which have passed by the image sensor 2d1 are stacked in the stacker 2e. The feeder 2b, the transferring unit 2c, the magnetic ink character reader 2d and the image sensor 2d1 are wholly controlled by the capturing unit controller 2g, and the A/D converter 2f converts a captured signal from the image sensor 2d1 into a digital signal and transmits the digital signal to the recognizing unit 3.

The recognizing unit 3 is constituted by a recognizing/determining section 3a which is dedicated processing hardware, a frame memory 3b, and a work station 3c. The recognizing/determining section 3a has a 16-megabyte memory; it functions to recognize an amount in accordance with the attribute of character data received from the magnetic ink character reader 2d and also to compress an image display data cut out from the optical image data.

The frame memory 3b has a 4-megabyte memory to store image data of 200 mm×85 mm (3 megabytes). Each time the image data on one document is stored, the data is transferred to the recognizing/determining section 3a via a VME (Versa Module Europe) bus. The compressed image data, the magnetic ink character recognition result, and the result of the recognition of the amount column are transmitted to the work station 3c via a communication circuit LAN. The work station 3c has a display 3c1 such as a CRT, a keyboard 3c2, a CPU 3c3, and a hard disk 3c4 (a first storage means and a second storage means); it enables an operator to enter a correction through the keyboard 3c while watching the display screen if a recognition error has been found. All processing commands are issued from the work station 3c. The work station 3c may be a personal computer.

The encoder unit 4 is constituted by a hopper 4a for receiving documents, the image of which has been captured-through the capturing unit 2, which has been segmented through the recognizing unit 3, and the amount of which has been recognized, a feeder 4b, a transferring unit 4c, a magnetic ink character reader (MICR) 4d with a magnetic head which is provided on the transferring unit 4c, an encoder 4e for magnetically printing (encoding) an amount, a printer 4f for printing (endorsing) endorsement, an encoder unit controller 4g, and a stacker section 4h comprised of a stacker 1 and a stacker 2 for collecting the documents. When an encoding command is issued through the work station 3c, the documents are let out one sheet at a time from the hopper 4a and sent to the transferring unit 4c. The magnetic ink character recognition results are sent back to the work station 3c. Encoding and endorsing data based on the above results are received from the work station 3c to perform the printing.

The operation of the check processing equipment having the structure stated above will now be described with reference to FIGS. 3 to 10.

Figure 3:
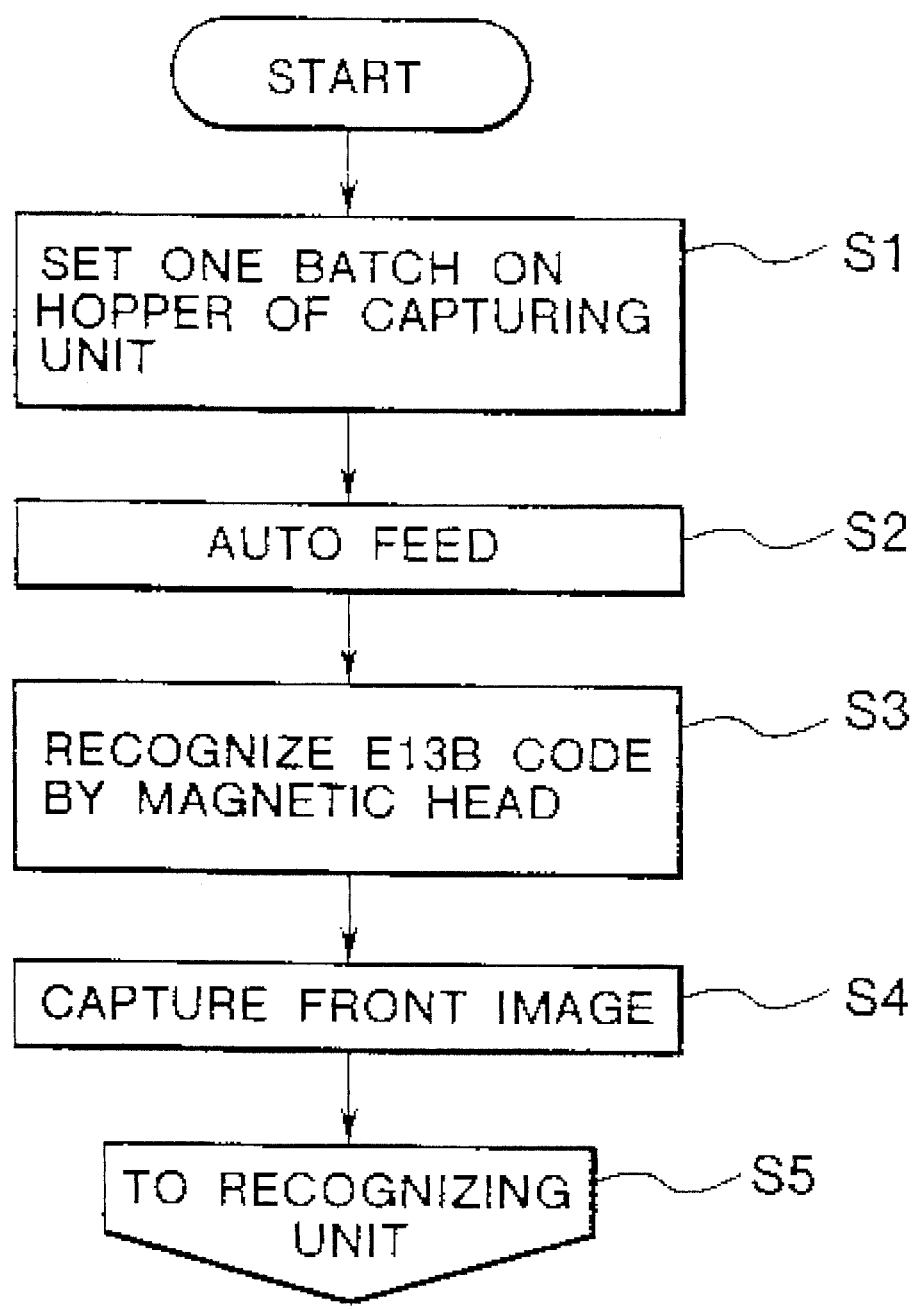
FIG. 3 is a flow chart showing an example of the processing implemented by a document reading unit.

FIG. 3 is a flow chart showing an operation example of the capturing unit 2. When an operator sets one batch (a set of a plurality of transactions: max. 300 sheets) of the documents in the hopper 2a (Step S1) and presses "F1" key of the keyboard 3c2 shown in FIG. 4, the documents are automatically sent from the feeder 2b to the transferring unit 2c at the rate of one piece per second. The documents sent to the transferring unit 2c are transferred at the rate of 720 mm per second (Step S2), during that the magnetic head recognizes an E13B code line which is a kind of magnetic ink character (Step S3), and the image sensor 2d1 captures the images on the front faces of the documents (Step S4). The character information recognized in the Step S3 is supplied to the recognizing/determining section 3a of the recognizing unit 3. The images which have been captured in the Step S4 are stored in the frame memory 3b in the recognizing unit 3 through the A/D converter 2f in the capturing unit controller 2g (Step S5).

Figure 5:
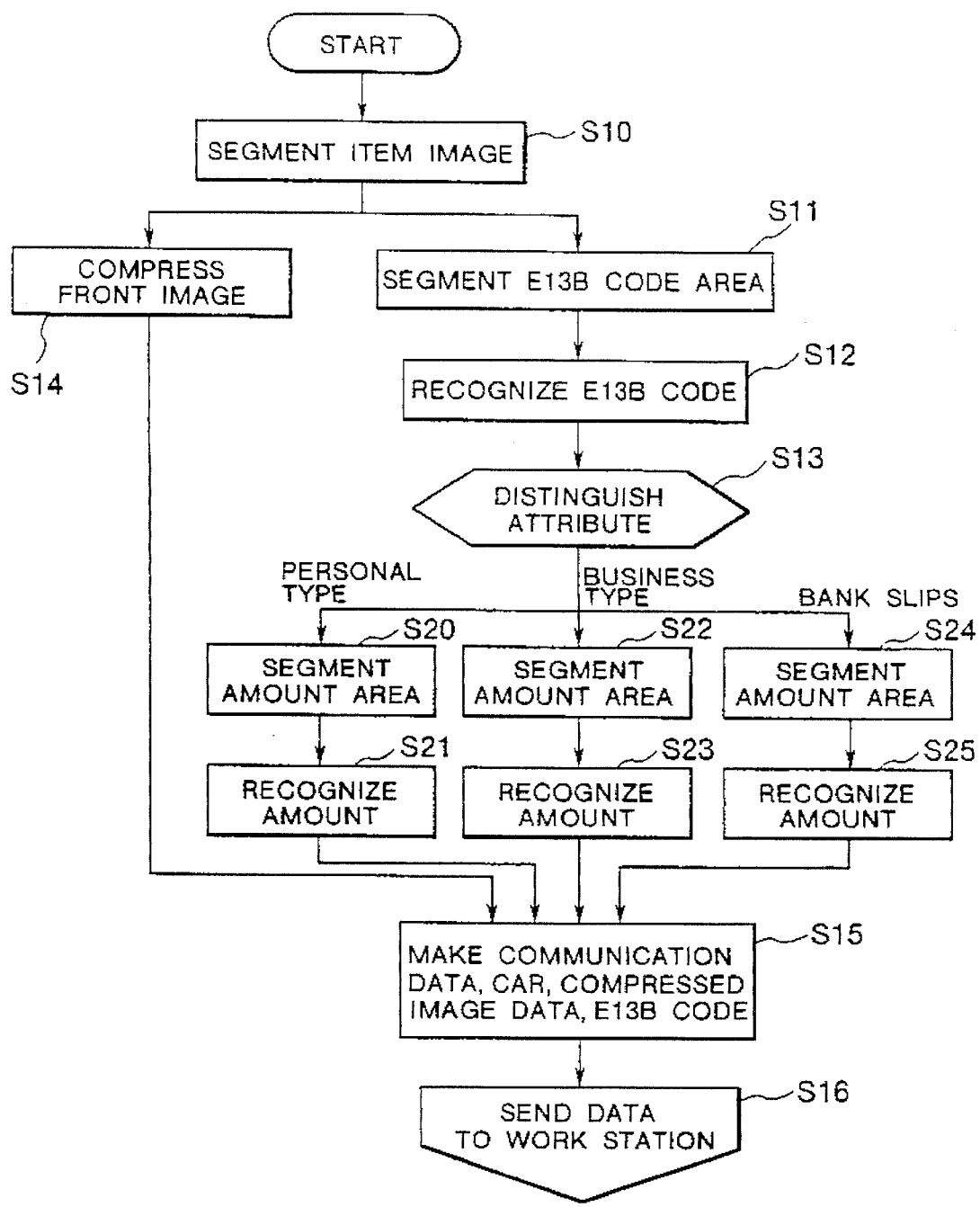
FIG. 5 is a flow chart showing an example of the processing implemented by a recognizing unit.

FIG. 5 is the flow chart showing an operation example of the recognizing unit 3. The recognizing unit 3 segments the document image data from the image data which has been captured through the capturing unit 2 (Step S10), then the image data for display is compressed (Step S14) and the E13B code area is segmented from the document image (Step S11). After that, the E13B code is recognized optically (Step S12) and matched to the character data received from the magnetic ink character reader 2d (Step S13), and the following three processings are performed. That is, the amount area of the personal check 8 is segmented (Step S20) and the amount is recognized (Step S21), the amount area of the business check 9 is segmented (Step S22) and the amount in the amount area of the business check 9 is recognized (Step S23), or the amount area of the bank slip 6, 7, 10 or 11 is segmented (Step S24) and the amount is recognized (Step S25).

Then, the recognizing/determining section 3a makes communication data for the compressed image data, the aforesaid amount recognition results, the credit/debit determining result, and the E13B code line recognition result (Step S15), and sends the made communication data to the work station 3c (Step S16). The aforesaid personal check and business check are different in the number of printing areas in the clear band.

The processing for correction and balancing in the recognizing unit 3 will now be described.

Figure 6:
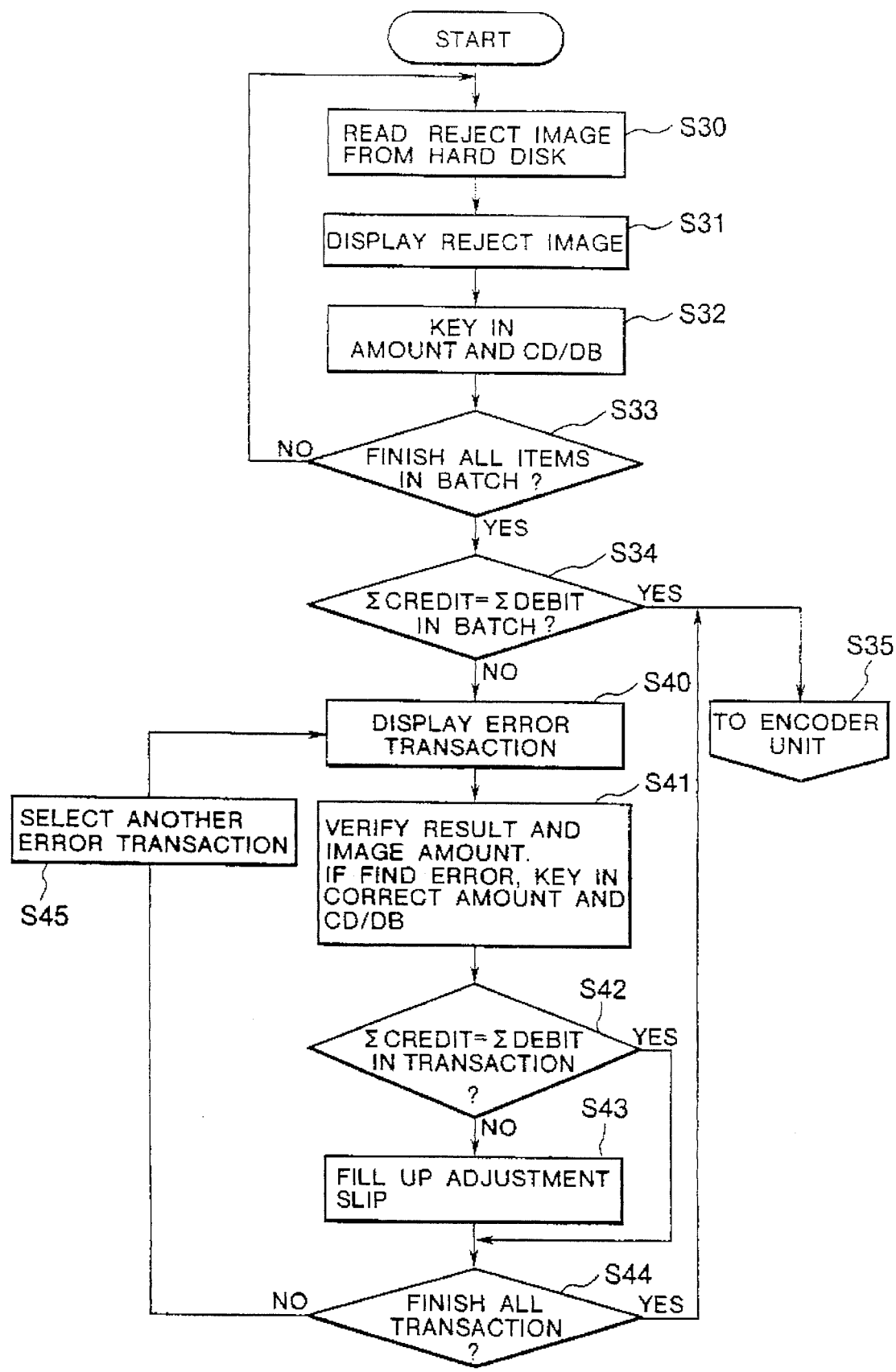
FIG. 6 is a flow chart showing a mode of the processing of correcting and balancing.

FIG. 6 shows the flow chart applied to a less skilled operator. The operator presses "MODE" key shown in FIG. 4 to call up the mode display screen illustrated in FIG. 8 and selects a first operator mode. Out of all the compressed document image data in one batch, the image data which has been rejected due to unrecognizable amounts, undeterminable credit/debit, or other reason are read from the hard disk 3c4 of the work station 3c (Step S30). The rejected image data (see FIG. 8) are expanded and displayed on the display 3c1 (Step S31). Referring to the displayed image, the operator presses the amount keys (0–9) or the credit (CD) or the debit (DB) key of the keyboard 3c2 shown in FIG. 4 (Step S32).

The CPU 3c3 determines whether the correction by key-in entry of the rejected documents in the batch has been finished or not (Step S33) and if it finds that the correction has not yet been completed, then it goes back to the Step S30 to repeat the same processing. If the system decides that the key-in correction has been finished, then it automatically checks the all CD/DB amounts in the batch for matching (Step S34). If the matching has been confirmed, then the operator transfers the documents into the hopper 4a in the encoder unit 4 from the stacker 2e (Step S35). If mismatching is found at the above Step S34, the CPU 3c3 automatically selects a transaction in question and displays all the documents involved in the transaction on the display 3c1 (Step S40). The operator verifies the amounts of the displayed image data against the data which has been entered through the keyboard. 3c2 or by character recognition and enters corrections through the keyboard 3c2 (Step S41) if errors resulting from erroneous recognition by machine or entry mistakes by the operator are found.

Figures 8, 9:
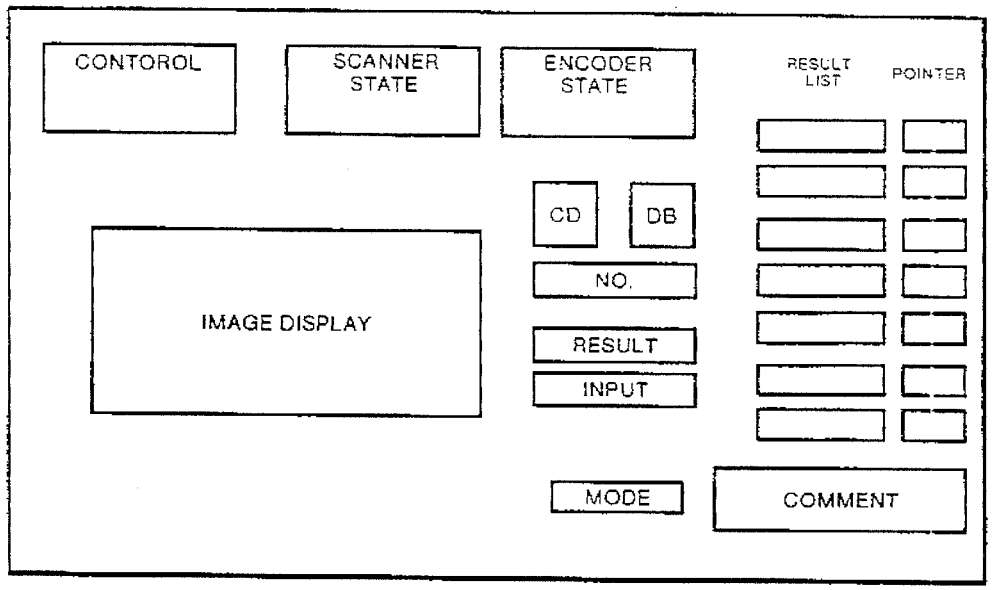
FIG. 8 is a display view showing an example of image data regarding the document.
FIG. 9 is an allocation view illustrating an example of an adjustment slip.

The entry of the correct tons is performed on the display screen illustrated in FIG. 8. The image of the transaction and the input data can be displayed in sequence. The moment an input is made through the keyboard 3c2, the balancing for the transaction is automatically carried out, then the total amounts of the credit and the debit in the transaction are checked for matching (Step S42); if they coincide with each other, then the system determines whether the balancing for all the transactions has been completed or not (Step S44), and if it has been completed, then the system proceeds to the next processing, i.e. printing (Step S35). If the total amounts of the credit and the debit do not coincide in the Step S42 above, it means that exceptional errors have occurred, including an erroneous entry of the total amount of the deposit ticket 5 of a customer (erroneous entry in the amount column 5a of FIG. 2A), the loss of a document, a wrong document which has been mixed in, and an erroneous entry by a teller who fills out cash in, cash out slips and general bank slips, etc. Therefore, the operator recognizes-that an exceptional error has occurred and fills out an adjustment slip (see FIG. 9) to carry out the adjustment (Step S43). If there is still a transaction left to be corrected in the Step S44, then the next transaction having an error is extracted (Step S45) and the same processing is repeated beginning with the Step S40.

Figure 7:
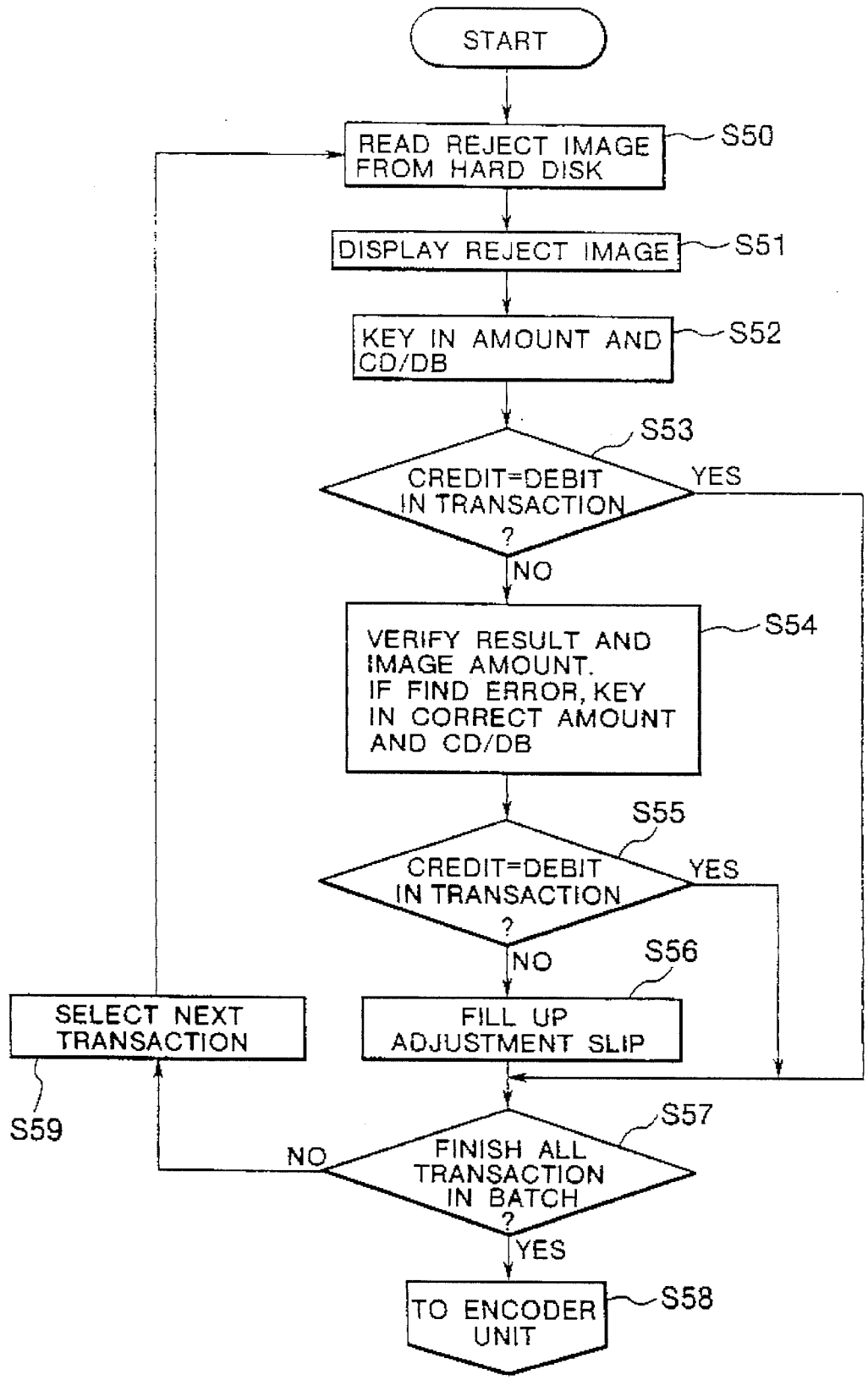
FIG. 7 is a flow chart showing another mode of the processing of correcting and balancing.

FIG. 7 shows the flow chart applied to a highly skilled operator. The operator presses "MODE" key shown in FIG. 4 to call up the mode display screen illustrated in FIG. 8 and selects a second operator mode. This flow chart differs from that shown in FIG. 6 in that the correction, balancing, and the processing for an exceptional error are carried out for each transaction in a batch.

The compressed rejected image data are read from the hard disk 3c4 of the work station 3c (Step S50), then the rejected image data (see FIG. 8) are expanded for the reconstruction and displayed on the display 3c1 (Step S51). Referring to the displayed image, the operator enters a corrected amount and presses the credit (CD) or the debit (DB) key (Step S52). The system automatically verifies the credit or debit amount in the transaction unit and checks the result (Step S53). If the balancing has been accomplished, then the system determines whether the required processing for all the transactions has been completed or not (Step S57); and if the processing has not yet been completed, then the system carries out the same processing for the next transaction unit.

If the balancing cannot be achieved in the Step S52, then all documents of the transaction unit are displayed on the display 3c1, so that the operator checks the amounts given in the image against the entered data and enters corrected amounts or presses the credit or debit key (Step S54). Upon completion of the key entry, the balancing of the transaction is automatically implemented and the balancing of the credit and debit is checked (Step S55). If the matching of the credit and debit is confirmed, then the same processing is carried out for the next transaction unit (Step S57).

If mismatching is found in the Step S55 above, it means that exceptional errors have occurred, including an erroneous entry of the total amount of the deposit ticket 5 of a customer (erroneous entry in the amount column 5a of FIG. 2A), the loss of a document, a wrong document which has been mixed in, and an erroneous entry by a teller. Therefore, the operator recognizes that an exceptional error has occurred and fills out an adjustment slip (see FIG. 9) to carry out the adjustment (Step S56).

In the next step, the system determines whether the proof of all the transactions in the batch has been completed or not (Step S57); if the proof has not yet been finished, then the system selects the next transaction (Step S59) and the same processing is repeated, beginning with the Step S50. If the system finds in the Step S57 that the processing of all the transactions in the batch has been completed, then it proceeds to the next processing, i.e. the printing by the encoder unit 4 (Step S58).

Figure 10:
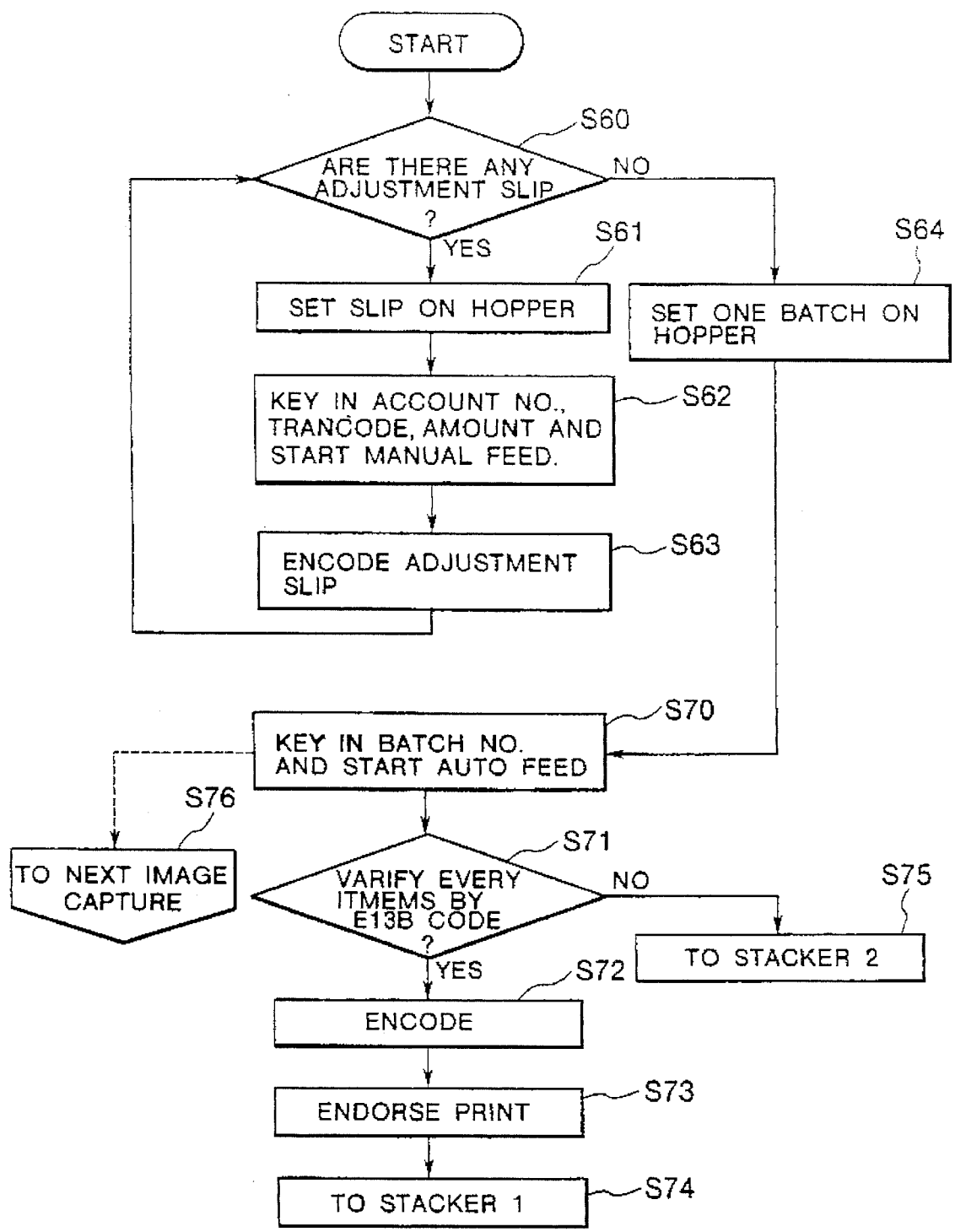
FIG. 10 is a flow chart showing an example of the processing implemented by the encoder unit.

FIG. 10 shows the flow chart of the encoding and endorsing operation in the encoder unit 4.

Figure 4:
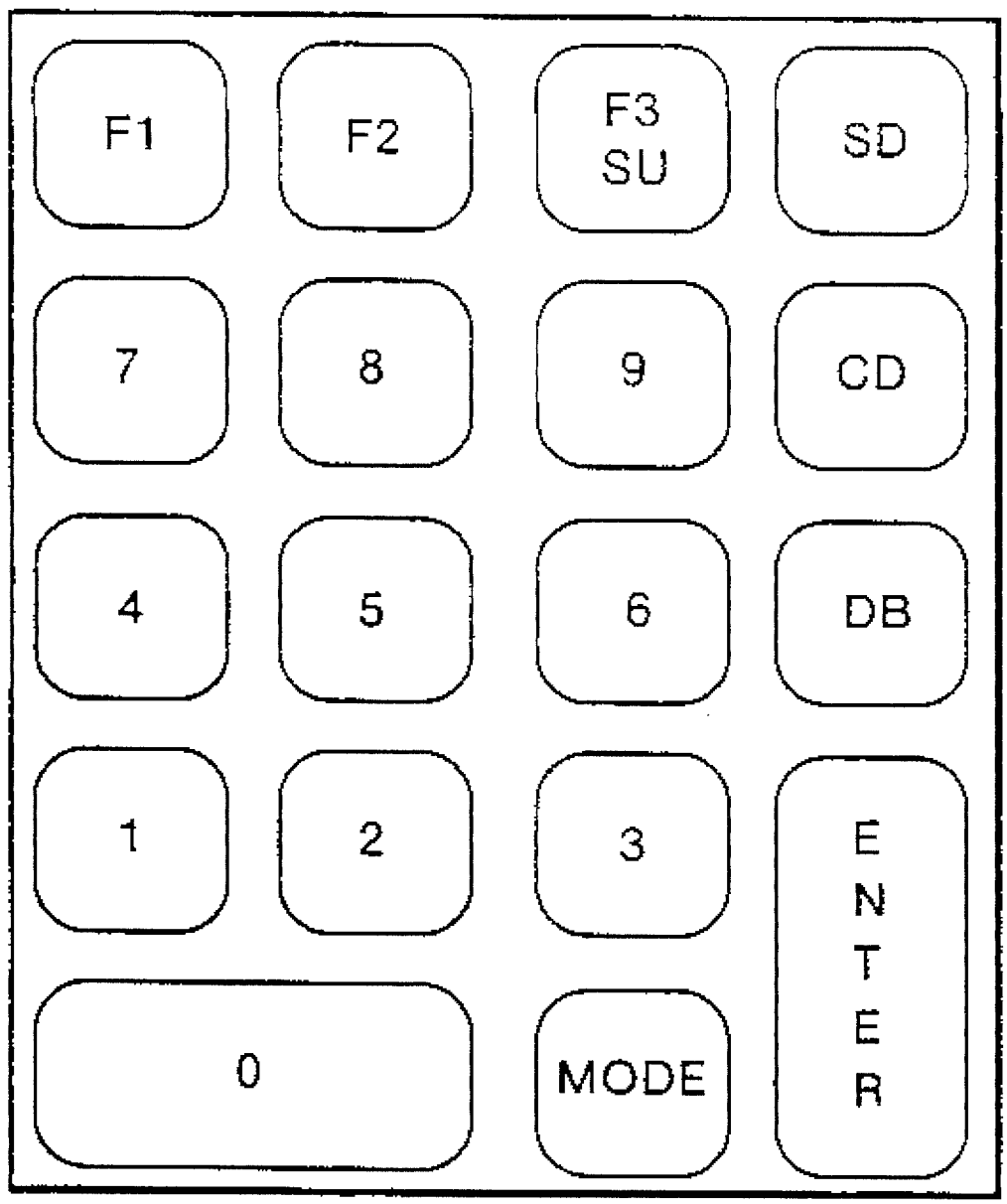
FIG. 4 is an allocation view illustrating an example of a keyboard.

The "F2" key shown in FIG. 4 is pressed to place the display screen of FIG. 8 in the encoding mode. It is first determined whether at least one adjustment slip exists in the batch (Step S60); if it does, then the adjustment slip is set in the feeder 4b of the hopper 4a of the encoder unit 4, and the account number, the processing code, and the adjusted amount are entered through the keyboard 3c2, and manual encoding is performed (Step S62). More specifically, the numeral keys and "ENTER" key are operated, then required information is entered through the keyboard 3c2 of the work station 3c. Further, "F3" key shown in FIG. 4 is pressed to start feeding the documents from the feeder 4b to carry out encoding and endorsing and stack the documents in the slacker 1 of the stacker section 4h (Step S63). Information such as an adjusted amount is encoded on the E13B code line of the adjustment slip. If there are a plurality of adjustment slips in one batch, the same procedure is repeated for the number of the adjustment slips.

In the next step, all the slips of the batch are set in the hopper 4a in the encoder unit 4 (Step S64).

The "F1" key and the "ENTER" key shown in FIG. 4 are pressed to enter a predetermined batch number and the like through the keyboard, 3c2 of the work station 3c, then "F3" key illustrated in FIG. 4 is pressed to carry out automatic encoding (Step S70).

In this case, the amounts are encoded basically on the first-in first-out basis. To avoid an error such as the documents being switched thereby to enhance safety, the E13B code received from the work station 3c is verified against a corresponding code in the encoder which has been magnetically recognized (Step S71). Then, the document is subjected to encoding (Step S72) and endorsing (Step S73) and stacked in the stacker 1 of the stacker section 4h. This processing is repeated until the document in the hopper 4a becomes empty. Unverifiable media are collected in the stacker 2 without being subjected to encoding or endorsing (Step S75). As soon as the encoder is actuated, the "F3" key and the "ENTER" key can be pressed to exit from the encode mode so as to execute the image capture of the next batch (Step S76). This concurrent operation increases the throughput of the entire system.

Thus, the check processing equipment according to the present invention has added the character recognition art (CAR) to proofing machine thereof, thereby providing higher processing efficiency according to the recognizing capability; it is also capable of concurrently implementing the reading of a document image, correcting and proving an amount, and encoding, thereby providing higher processing efficiency; and it further allows data to be verified and determined through a work station, thereby reducing encoding errors.

What is claimed is:

1. A check processing equipment comprising:
   a document capturing unit which is equipped with a hopper to be loaded with documents such as deposit tickets and checks composing plural transaction units, a feeder which feeds one piece of document at a time, a transferring unit which transfers the fed document to a stacker, a magnetic ink character reading means for capturing magnetic ink characters printed on the document, and an image capturing means which is provided on the transferring unit and which captures and digitizes the document images;
   a recognizing unit which is equipped with an amount character recognizing means for recognizing an amount character from the image, a first storage means for storing amounts which have been recognized by said recognizing means, a second storage means for storing the image of the documents which have been captured by said image capturing means, and a recognizing/determining means for determining the type of a document from the attribute of the magnetic ink characters captured through said magnetic ink character reading means and for identifying the amount area of the image data;
   a display means for displaying document image data which are stored in said second storage means, in the form of a document image; and
   an input means for allowing a numeral change to be made to correct an amount indicated and for entering the type of processing;
   whereby a document is fed out by said feeder, magnetic ink characters are read by said magnetic ink character reading means, and the images of the documents are captured by said image capturing means concurrently as said recognizing/determining means displays the images of particular documents on said displaying means for enabling an operator to correct amounts through said input means.

2. A check processing equipment according to claim 1, wherein said transaction unit is used at a bank in the United States and consists of a deposit ticket and plural documents, for instance, personal checks, business checks, bank slips, cash in slips, and cash out slips.

3. A check processing equipment according to claim 1, wherein said display means displays the rejected document images which can not be recognized by said amount character recognizing means, or all document images of a particular transaction of which total amount of credit is not equal to the total amount of debit.

4. A check processing equipment according to claim 1, which is structured to permit selection between:
   a first operator mode wherein the images of all documents, which cannot be recognized by said amount character recognizing means, are displayed, so as to enable an operator to inspect said images and key in the amount data to make corrections, then balancing is executed automatically for each transaction in a batch, and if there is any unbalanced transaction, the operator verifies displayed document images against input data so as to correct erroneous data by the inspection; and
   a second operator mode wherein unrecognizable, rejected data in a transaction unit are keyed in, balancing is automatically implemented, and if any unbalanced transaction is found, erroneous data are corrected by inspection for each transaction unit in order until the processing of a batch is completed.

5. A check processing equipment according to claim 4, wherein if an exceptional error such as erroneous entry of an amount by a customer occurs, then said each mode allows the operator to manually adjust the monetary amount by observing the actual document directly.

6. A check processing equipment according to claim 1, wherein said recognizing/determining means compresses the captured data prior to storing the second storage means and when said display means displays the document image data, wherein said recognizing/determining means expands the compressed image data prior to the displaying.

7. A check processing equipment according to claim 1, further comprising an encoder unit which is equipped with a hopper to be loaded with whole documents in a batch, the balancing of which has been completed, a feeder for feeding one piece of document at a time, a transferring unit for transferring the fed document to a stacker, a magnetic ink character reading means for reading the attribute data of the document, an encoding printer for printing a magnetic ink character, an endorsing printer for printing a character on the back face of a document, and a controller for printing, by using said encoding printer, the amount data stored in said first storage means in accordance with the attribute data of the document which has been read through said magnetic ink character reading means, for printing a character, which indicates the completion of processing, on the back face by using said endorsing printer, and once setting the completed batch in said encoder unit, the next new batch in said hopper of said document capturing unit is also processed concurrently.

8. A check processing equipment according to claim 7, wherein, if an exceptional error such as erroneous entry of an amount by a customer and the loss of a check occurs, then an adjustment slip for adjusting the errorneous entry issued by the operator is accepted in said hopper of said encorder unit.

* * * * *